US012139950B2

(12) United States Patent
Lange

(10) Patent No.: US 12,139,950 B2
(45) Date of Patent: Nov. 12, 2024

(54) THREADED BOLT, AND HINGE ASSEMBLY COMPRISING SUCH A THREADED BOLT

(71) Applicant: Bayerische Motoren Werke Aktiengesellschaft, Munich (DE)

(72) Inventor: Carsten Lange, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/686,109

(22) PCT Filed: Aug. 26, 2022

(86) PCT No.: PCT/EP2022/073742
§ 371 (c)(1),
(2) Date: Feb. 23, 2024

(87) PCT Pub. No.: WO2023/057127
PCT Pub. Date: Apr. 13, 2023

(65) Prior Publication Data

US 2024/0263499 A1 Aug. 8, 2024

(30) Foreign Application Priority Data

Oct. 5, 2021 (DE) ..................... 10 2021 125 785.9

(51) Int. Cl.
*E05D 5/12* (2006.01)
*E05D 3/02* (2006.01)
*E05D 5/10* (2006.01)

(52) U.S. Cl.
CPC ............... *E05D 5/121* (2013.01); *E05D 3/02* (2013.01); *E05D 2005/102* (2013.01);
(Continued)

(58) Field of Classification Search
CPC ....... E05D 7/10; E05D 7/1005; E05D 7/1044; E05D 2007/126; E05D 2007/1027;
(Continued)

(56) References Cited

U.S. PATENT DOCUMENTS 5,913,350 A * 6/1999 Kluting ............... E05D 11/1085 16/322
6,073,308 A 6/2000 Linnenbrink et al.
(Continued)

FOREIGN PATENT DOCUMENTS

CN 101435298 B * 9/2012
DE 1 768 521 U 6/1958
(Continued)

OTHER PUBLICATIONS

International Search Report (PCT/ISA/210) issued in PCT Application No. PCT/EP2022/073742 dated Dec. 1, 2022 with English translation (4 pages).
(Continued)

*Primary Examiner* — Chuck Y Mah
(74) *Attorney, Agent, or Firm* — Crowell & Moring LLP

(57) ABSTRACT

A threaded bolt for a hinge arrangement includes a cylindrical main body. On an outer circumferential surface thereof the cylindrical main body has a first frustoconical projection and a second frustoconical projection, which adjoins the first frustoconical projection. The diameter of a side of the first frustoconical projection that faces toward the second frustoconical projection is smaller than the diameter of a side of the second frustoconical projection that faces toward the first frustoconical projection. The first frustoconical projection comprises at least one tooth on its outer circumferential surface, which tooth protrudes radially beyond an imaginary continuation of the second frustoconical projection.

12 Claims, 2 Drawing Sheets

(52) U.S. Cl.
CPC ... *E05D 2005/122* (2013.01); *E05Y 2600/632* (2013.01); *E05Y 2900/531* (2013.01)

(58) Field of Classification Search
CPC ........... E05D 5/12; E05D 5/121; E05D 5/128; E05D 3/02; E05D 2005/102; E05D 2005/122; E05D 2005/124; B64C 1/1469; E05Y 2900/502; E05Y 2900/531; E05Y 2600/632
See application file for complete search history.

(56) References Cited

U.S. PATENT DOCUMENTS

| | | | | |
|---|---|---|---|---|
| 6,490,759 | B1 * | 12/2002 | Brueckner | E05D 5/121 16/342 |
| 6,594,858 | B1 * | 7/2003 | Kremer | E05D 11/084 16/342 |
| 2004/0025294 | A1 * | 2/2004 | Gruber | E05D 7/1044 403/14 |

FOREIGN PATENT DOCUMENTS

| | | | | |
|---|---|---|---|---|
| DE | 297 04 055 | U1 | 6/1997 | |
| DE | 198 49 056 | C1 | 1/2000 | |
| DE | 199 39 829 | A1 | 3/2001 | |
| DE | 10 2020 107 197 | B3 | 12/2020 | |
| EP | 1043468 | A2 * | 10/2000 | E05D 5/128 |
| EP | 0 893 565 | B1 | 10/2002 | |
| WO | WO-2019176069 | A1 * | 9/2019 | B22D 17/002 |

OTHER PUBLICATIONS

German-language Written Opinion (PCT/ISA/237) issued in PCT Application No. PCT/EP/2022/073742 dated Dec. 1, 2022, with English translation (8 pages).
German-language Office Action issued in German Application No. 10 2021 125 785.9 dated Feb. 9, 2022 (4 pages).

* cited by examiner

THREADED BOLT, AND HINGE ASSEMBLY COMPRISING SUCH A THREADED BOLT

BACKGROUND AND SUMMARY

The present disclosure relates to a threaded bolt for a hinge arrangement having the features disclosed herein, and to a hinge arrangement comprising such a threaded bolt.

A hinge arrangement for a motor vehicle for the pivotable attachment of a motor vehicle door to a body of the motor vehicle is known from the prior art. The known hinge arrangement comprises a first hinge element and a threaded bolt. The threaded bolt is arranged in a through-bore in the first hinge element such that an end circumferential surface of the bolt, which comprises a toothing around the periphery, rests against the first hinge element. The toothing cuts into the first hinge element in this case. This prevents rotation of the threaded bolt relative to the first hinge element, with the result that a screw can be screwed into the threaded bolt to secure the threaded bolt to the first hinge part, without the threaded bolt rotating with the screw.

Over the course of the service life, however, the toothing generally cuts further into the first hinge part. This results in loosening of the screwed connection.

DE 1 768 521 U describes a hinge with a rotary bolt which is provided, directly above a lower rotary sleeve, with a bead against which the upper rotary sleeve slidingly rests.

DE 198 49 056 C1 discloses a hinge arrangement for pivotably mounting a body part by means of a mounting bolt.

An object of the present disclosure is to provide a threaded bolt which can be securely fixed to a first hinge part by means of a screw for a lengthy period of time, i.e. in the case of which a screwed connection of the threaded bolt with the screw does not loosen over the course of the service life. Another object of the present disclosure is to provide a hinge arrangement having such a threaded bolt.

This and other objects are achieved by the threaded bolt having the features of patent claim 1 and by the hinge arrangement having the features of patent claim 4.

The disclosure thus provides a threaded bolt for a hinge arrangement, by means of which a motor vehicle door can be pivotably fixed to a body of a motor vehicle. The hinge arrangement comprises a cylindrical main body. On its outer circumferential surface, the cylindrical main body has a first frustoconical projection and a second frustoconical projection which adjoin one another. The diameter of that side of the first frustoconical projection that faces toward the second frustoconical projection is smaller than the diameter of that side of the second frustoconical projection that faces toward the first frustoconical projection. The first frustoconical projection is thus axially recessed in relation to the second frustoconical projection. The first frustoconical projection comprises at least one tooth on its outer circumferential surface. The tooth extends radially outward in such a way that it axially protrudes beyond an imaginary continuation of the lateral surface of the second frustoconical projection. The tooth would thus protrude laterally beyond the circumferential surface of the second frustoconical projection if the second frustoconical projection is extended in the direction of the first frustoconical projection. Therefore, the tooth can cut into a first hinge part when it is mounted on the first hinge part. As a result, the threaded bolt is secured against rotation about an axis of rotation, which extends in the axial direction of the threaded bolt, relative to the first hinge part.

The core concept of the disclosure is thus to radially inwardly offset the first frustoconical projection relative to the second frustoconical projection by way of a step, with the result that a cavity is formed between the first hinge part and the first frustoconical projection, and to provide the first frustoconical projection with the tooth, which cuts into the first hinge part in the mounted state of the threaded bolt on the first hinge part.

Within the context of the present disclosure, the term “tooth” describes an element which protrudes radially beyond the lateral surface of the threaded bolt, in particular the lateral surface of the first frustoconical projection.

The tooth may taper radially outward, with the result that it can cut into the first hinge part. This secures the threaded bolt against rotation relative to the first hinge part.

The tooth has a triangular profile, for example.

The outer circumferential surface of the second frustoconical projection rests on the first hinge part annularly around the periphery in the mounted state. Therefore, the risk of loosening of the connection between the threaded bolt and the first hinge part is reduced in comparison with the known hinge arrangement, since the second frustoconical projection cannot cut into the first hinge part.

When the tooth is pressed into the first hinge part, material throw-ups generally occur. Since the thrown-up material is collected in the cavity formed between the threaded bolt and the first hinge part in the mounted state, the thrown-up material does not influence the connection between the threaded bolt and the first hinge part even in the event of dismounting and remounting. This prolongs a possible service life of the threaded bolt.

The first frustoconical projection and the second frustoconical projection taper, for example, in the same axial direction.

In a preferred embodiment of the threaded bolt according to the disclosure, the main body comprises a blind hole into which a screw can be screwed. The threaded bolt can thus be fixed to the first hinge part.

The blind hole may be a threaded bore.

The blind hole extends, for example, in the axial direction of the threaded bolt.

The blind hole may be introduced in the threaded bolt and thus be open from the side which is closer to the first frustoconical projection than the second frustoconical projection.

In one exemplary embodiment, the threaded bolt according to the disclosure comprises two teeth.

The teeth may be arranged opposite one another.

In a preferred embodiment, the threaded bolt according to the disclosure comprises three teeth.

The teeth may be arranged at regular intervals in relation to one another.

The present disclosure also relates to a hinge arrangement, in particular for a motor vehicle. The hinge arrangement comprises a first hinge part, which has a through-bore and a hinge eyelet. The hinge eyelet is frustoconical. The hinge eyelet is arranged at an axial end of the through-bore. The hinge arrangement also comprises a threaded bolt described above. The tooth of the threaded bolt is pressed in a wall defining, i.e. circumferentially surrounding, the hinge eyelet such that the second frustoconical projection rests areally against the wall defining the hinge eyelet. In this case, a cavity is formed between the first frustoconical projection and the wall.

The hinge arrangement according to the disclosure has the same advantages as the threaded bolt described above, which is why reference is made at this juncture to the statements regarding the threaded bolt.

At least part of the second frustoconical projection may rest circumferentially areally against part of the wall defining the hinge eyelet.

The hinge eyelet is for example a cutout, which is laterally delimited by the wall and is open at the top and bottom.

The wall may have the same inclination as the first frustoconical projection and/or the second frustoconical projection. The second frustoconical projection can therefore rest areally against the wall.

The hinge eyelet may have an axial extent such that the first frustoconical projection and the second frustoconical projection can be arranged therein.

The axial extent of the hinge eyelet corresponds for example to the sum of the axial extent of the first frustoconical projection and the axial extent of the second frustoconical projection.

In a preferred embodiment, the hinge arrangement according to the disclosure comprises a screw. The screw is screwed to the threaded bolt in the through-bore, in particular is screwed in the blind hole of the threaded bolt.

The screw is, for example, introduced in the through-bore from a side opposite the hinge eyelet.

The threaded bolt is, for example, introduced in the through-bore from the side of the hinge eyelet such that at least part of the second frustoconical projection rests annularly around the periphery against part of the wall defining the hinge eyelet.

The screw and the threaded bolt are thus for example introduced in the through-bore from different sides.

In an exemplary embodiment of the hinge arrangement according to the disclosure, the cavity is in the form of a frustoconical ring. The cavity thus has the shape of an axially tapering ring.

In a preferred embodiment of the hinge arrangement according to the disclosure, the outer circumferential surface of the second frustoconical projection and the wall defining the hinge eyelet are smooth, i.e. free of unevennesses, in particular teeth. Therefore, the outer circumferential surface of the second frustoconical projection and the wall defining the hinge eyelet rest areally against one another, with the result that they form a fluid-tight connection. It is therefore not possible for any fluids, such as salt water, to enter the cavity. This prolongs the service life of the hinge arrangement. It is also not possible for any paint applied during the manufacture of the motor vehicle to enter the cavity, this simplifying the painting process.

In a preferred embodiment, the hinge arrangement according to the disclosure comprises a second hinge part, which is pivotably connected to the first hinge part by way of the threaded bolt.

The first hinge part is fixed, for example, to a body of the motor vehicle, in particular is screwed to the body. The second hinge part is fixed, for example, to a door of the motor vehicle, in particular is screwed to the door.

As an alternative, the first hinge part may be fixed to the door, in particular screwed to the door, and the second hinge part may be fixed to the body of the motor vehicle, in particular screwed to the body.

The disclosure will be explained in more detail below on the basis of an exemplary embodiment illustrated in the drawing. In the drawings:

DETAILED DESCRIPTION OF THE DRAWINGS

Figure 1:
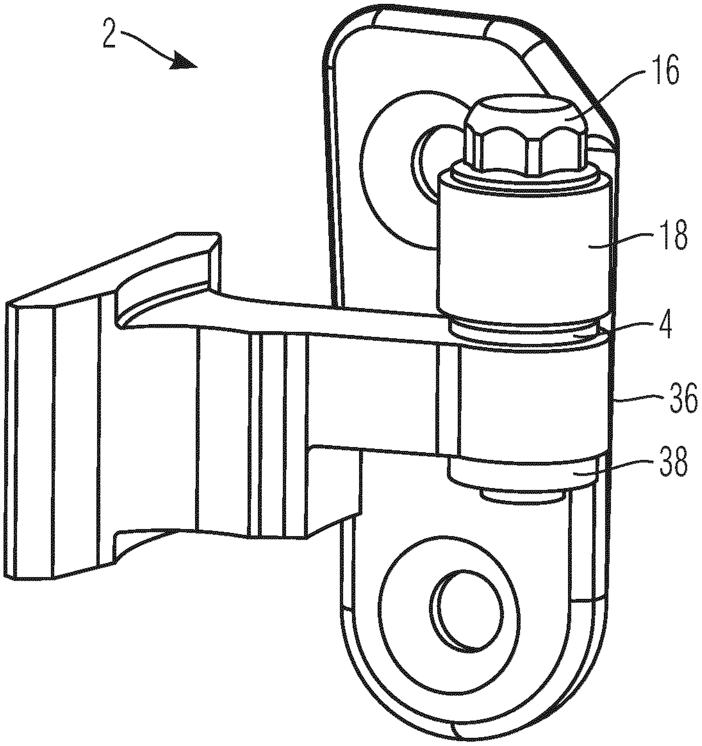
FIG. 1 shows a perspective view of a hinge arrangement according to the disclosure.

FIG. 1 shows a hinge arrangement 2 for a motor vehicle according to the disclosure. The hinge arrangement 2 serves for the pivotable attachment of a motor vehicle door (not illustrated) to a body (not illustrated) of the motor vehicle.

The hinge arrangement 2 comprises a first hinge part 18, a second hinge part 36, a threaded bolt 4, a screw 16, a bushing (not illustrated) and a fixing element 38. The first hinge part 18 is pivotably connected to the second hinge part 36 by way of the threaded bolt 4, the screw 16 and the bushing, which is pushed on a cylindrical main body 6 of the threaded bolt 4. The fixing element 38 secures the second hinge part 36 to the threaded bolt 4. The second hinge part 36 is fixed to the motor vehicle door.

Two screws (not illustrated) are used to fix the first hinge part 18 to the body of the motor vehicle. To this end, the first hinge part 18 comprises an attachment plate 28. The attachment plate 28 has two cutouts 30 in which the screws are arranged in the mounted state of the first hinge part 18 on the body.

The first hinge part 18 comprises a mounting cylinder 32 with a through-bore 20. A hinge eyelet 22 adjoins the through-bore 20 at one end. The hinge eyelet 22 is laterally, that is to say radially, delimited by a wall 24 and is downwardly and upwardly, i.e. axially, open. The hinge eyelet 22 has a round cross-sectional area. The wall 24 laterally delimiting the hinge eyelet 22 extends obliquely. The diameter of the hinge eyelet 22 thus tapers from that end of the mounting cylinder 32 at which the hinge eyelet 22 is arranged, in the direction of the other end of the mounting cylinder 32, with the result that a frustoconical shape is formed.

Figure 2:
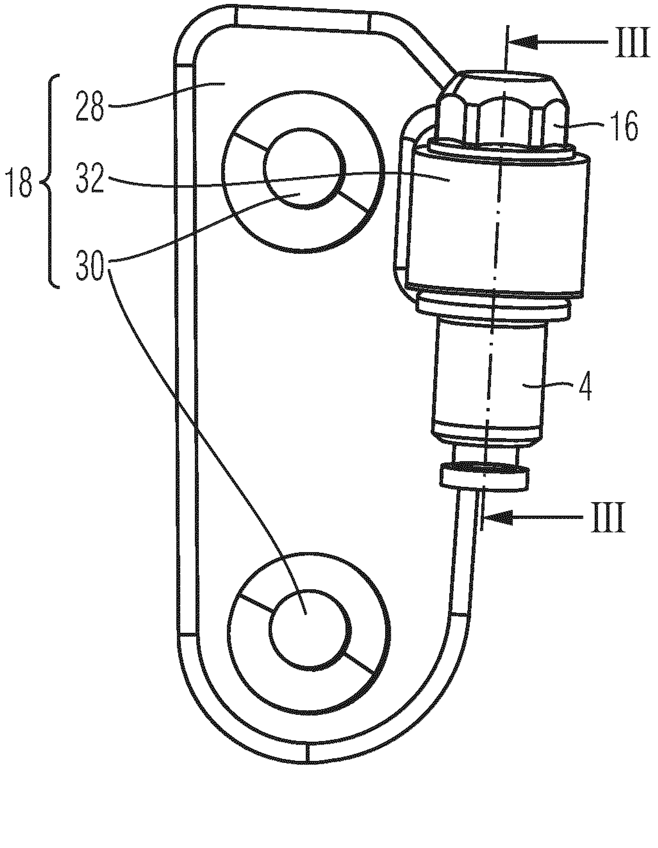
FIG. 2 shows a perspective view of a threaded bolt, a first hinge part and a screw of the hinge arrangement according to the disclosure.
Figure 3:
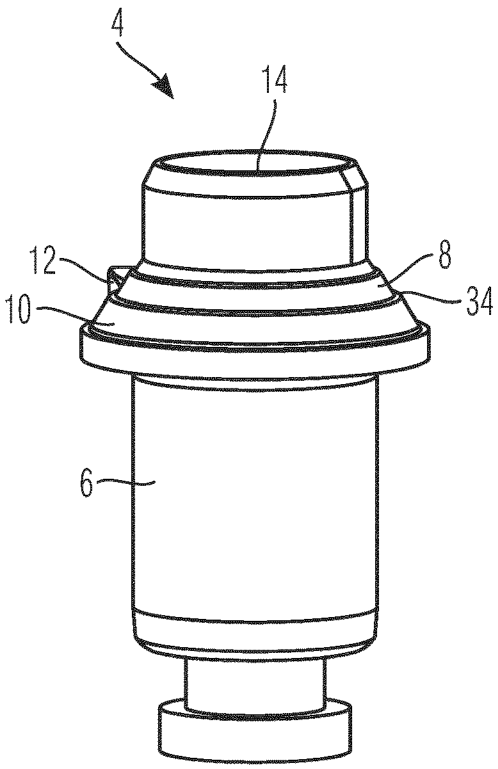
FIG. 3 shows a front view of the threaded bolt of the hinge arrangement according to the disclosure.
Figure 4:
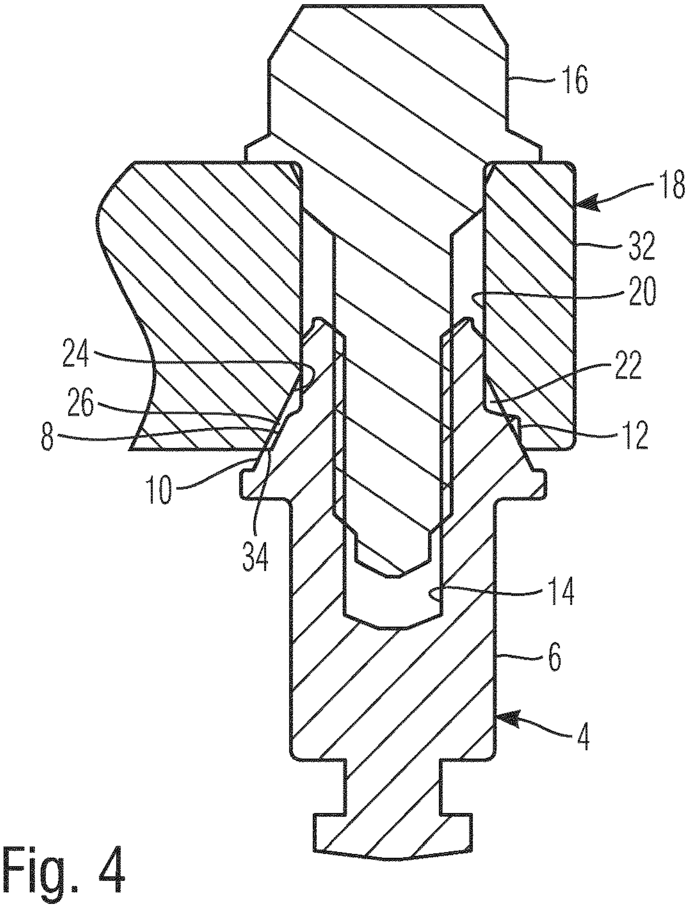
FIG. 4 shows a sectional view through the threaded bolt, the first hinge part and the screw of the hinge arrangement according to the disclosure along line III-III in FIG. 2.

As can be seen in particular from the isolated illustration of the threaded bolt 4 in FIG. 3 and the sectional view, illustrated in FIG. 4, through the hinge arrangement 2 illustrated in FIG. 2 along line III-III in FIG. 2, on the outer circumferential surface the cylindrical main body 6 of the threaded bolt 4 comprises a first frustoconical projection 8 and a second frustoconical projection 10. The inclination of the second frustoconical projection 10 is the same as the inclination of the wall 24. The second frustoconical projection 10 thus rests areally against the wall 24 in the mounted state.

The first frustoconical projection 8 and the second frustoconical projection 10 adjoin one another. The diameter of that side of the first frustoconical projection 8 that faces toward the second frustoconical projection is smaller than the diameter of that side of the second frustoconical projection 10 that faces toward the first frustoconical projection 8. The lateral surface of the first frustoconical projection 8 is thus radially recessed relative to the lateral surface of the second frustoconical projection 10. A connecting portion 34 connects the lateral surface of the first frustoconical projection 8 to the lateral surface of the second frustoconical projection 10. The first frustoconical projection 8, the second frustoconical projection 10 and the connecting portion 34 thus form a stepped shape.

On its outer circumferential surface, the first frustoconical projection 8 comprises three teeth 12. The teeth 12 are arranged at regular intervals in relation to one another. Imaginary connecting lines of the teeth 12 thus form an equilateral triangle. The teeth 12 taper radially outward. Therefore, the teeth 12 can dig into the wall 24 defining the hinge eyelet 22.

It is likewise conceivable for the frustoconical projection 8 to comprise more or fewer teeth 12.

The teeth 12 each extend radially far enough that they protrude beyond an imaginary continuation of the lateral surface of the second frustoconical projection 10 in the axial direction. They can therefore cut into the wall 24 when the second frustoconical projection 10 rests against the wall 24 defining the hinge eyelet 22. As a result, the threaded bolt 4 is secured against rotation about an axis of rotation extending along an axial direction of the threaded bolt relative to the first hinge part 18. This makes it possible to screw a screw 16 into a blind hole 14 in the cylindrical main body 6 or unscrew the screw from the blind hole without the threaded bolt 4 rotating with the screw 16, with the result that the threaded bolt 4 and the screw 16 can be secured to the first hinge part 18.

The screw 16 is introduced in the through-bore 20 from a side opposite the hinge eyelet 22. The screw 16 is thus introduced in the through-bore 20 from the other side in relation to the threaded bolt 4 (see FIG. 2).

The teeth 12 cutting into the wall 24 causes material of the first hinge part 18 to be thrown up. Owing to the radial offset of the first frustoconical projection 8 relative to the second frustoconical projection 10, a cavity 26 in the form of a frustoconical ring is formed between the first frustoconical projection 8 and the wall 24 defining the hinge eyelet 22. The cavity 26 is thus radially delimited by the first frustoconical projection 8 and the wall 24. The thrown-up material can remain in the cavity 26 without adversely affecting the connection between the threaded bolt 4 and the first hinge part 18. It is therefore possible for the threaded bolt 4 to be dismounted from the first hinge part 18 and then remounted. The hinge arrangement 2 according to the disclosure thus has a long service life and repeated use is possible.

The second frustoconical projection 10 has a smooth outer circumferential surface. The wall 24 defining the hinge eyelet 22 likewise has a smooth form, i.e. a form free of teeth and unevennesses. Consequently, the outer circumferential surface of the second frustoconical projection 10 rests against the wall 24 annularly around the periphery and thus fluid-impermeably in the mounted state. It is therefore not possible for any fluid, such as salt water, to enter the cavity, this further prolonging the service life of the hinge arrangement 2 according to the disclosure. Furthermore, it is therefore not possible for any paint applied during the manufacture of the motor vehicle to enter the cavity. This facilitates the manufacture of the motor vehicle.

LIST OF REFERENCE SIGNS

2 Hinge arrangement
4 Threaded bolt
6 Cylindrical main body
8 First frustoconical projection
10 Second frustoconical projection
12 Tooth
14 Blind hole
16 Screw
18 First hinge part
20 Through-bore
22 Hinge eyelet
24 Wall
26 Cavity
28 Attachment plate
30 Cutout
32 Mounting cylinder
34 Connecting portion
36 Second hinge part
38 Fixing element

What is claimed is:

1. A threaded bolt for a hinge arrangement, comprising:
a cylindrical main body, wherein
on an outer circumferential surface thereof the cylindrical main body has a first frustoconical projection and a second frustoconical projection, which adjoins the first frustoconical projection,
the diameter of a side of the first frustoconical projection that faces toward the second frustoconical projection is smaller than the diameter of a side of the second frustoconical projection that faces toward the first frustoconical projection, and
the first frustoconical projection comprises at least one tooth on its outer circumferential surface, which at least one tooth protrudes radially beyond a continuation of the second frustoconical projection.

2. The threaded bolt according to claim 1, wherein the cylindrical main body comprises a blind hole, in which a screw is screweable.

3. The threaded bolt according to claim 2, wherein the at least one tooth is two teeth or three teeth.

4. A hinge arrangement, comprising:
a first hinge part with a through-bore and a frustoconical hinge eyelet, further comprising a threaded bolt according to claim 3, wherein the at least one tooth is pressed in a wall defining the hinge eyelet of the first hinge part such that the second frustoconical projection rests against the wall and a cavity is formed between the first frustoconical projection and the wall.

5. The hinge arrangement according to claim 4, further comprising a screw, which is screwed to the threaded bolt in the through-bore.

6. The hinge arrangement according to claim 5, wherein the cavity is in the form of a frustoconical ring.

7. The hinge arrangement according to claim 6, wherein an outer circumferential surface of the second frustoconical projection and the wall defining the hinge eyelet are devoid of unevennesses.

8. The hinge arrangement according to claim 7, further comprising a second hinge part that is rotatably fixed to the threaded bolt.

9. The hinge arrangement according to claim 8, wherein the first hinge part is fixed to a body of a motor vehicle or to a door of the motor vehicle.

10. The hinge arrangement according to claim 8, wherein the second hinge part is fixed to a body of a motor vehicle.

11. The hinge arrangement according to claim 8, wherein the first hinge part is fixed to a door of a motor vehicle.

12. The hinge arrangement according to claim 1, wherein the second hinge part is fixed to a door of a motor vehicle.

* * * * *